May 23, 1972  F. HOCK  3,664,750
OPTICAL APPARATUS FOR MEASUREMENT OF A SPATIAL FUNCTION
Filed June 29, 1970  4 Sheets-Sheet 1
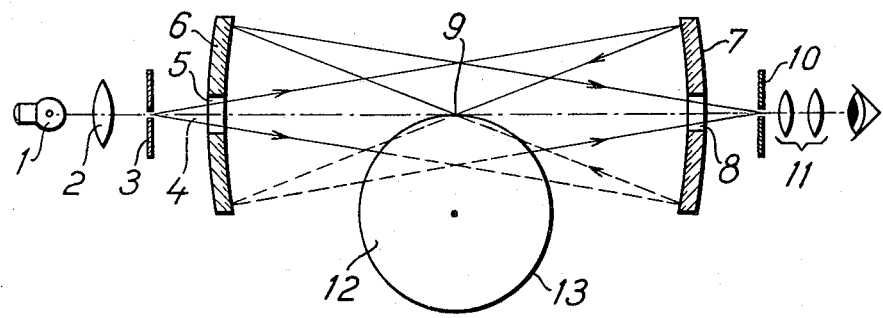
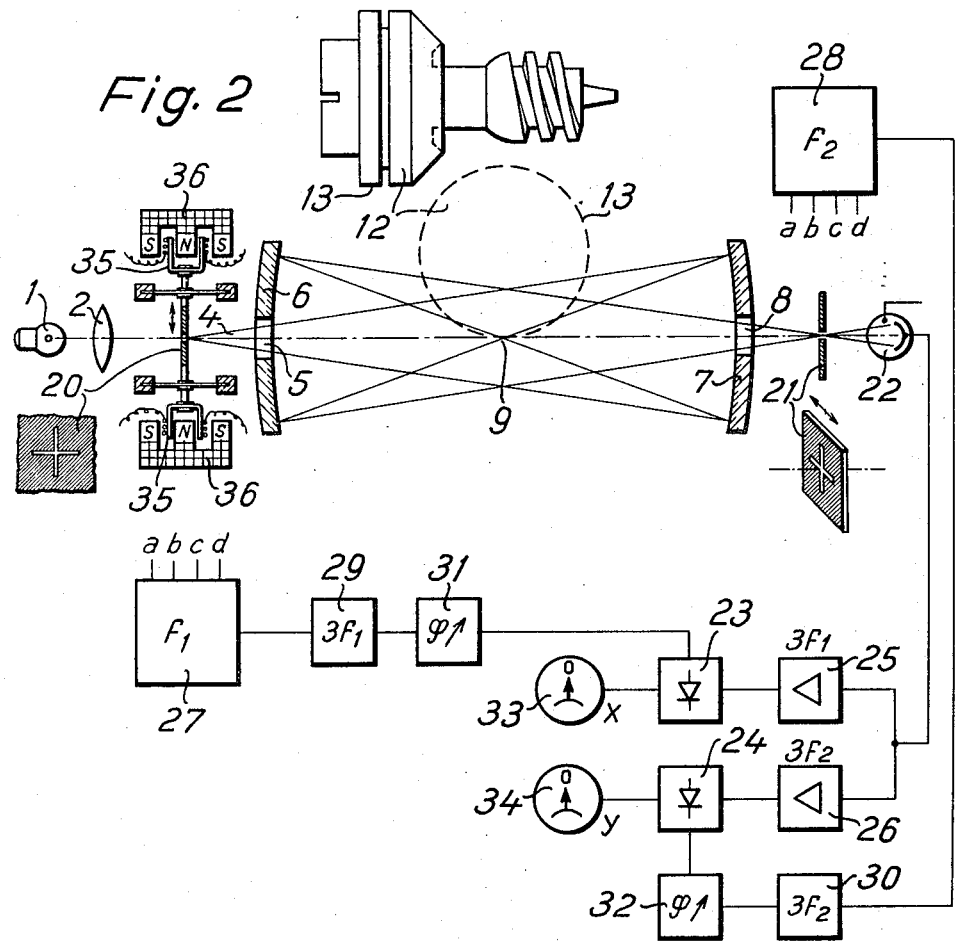
FROMUND HOCK
*INVENTOR*
BY *Krafft + Wells*

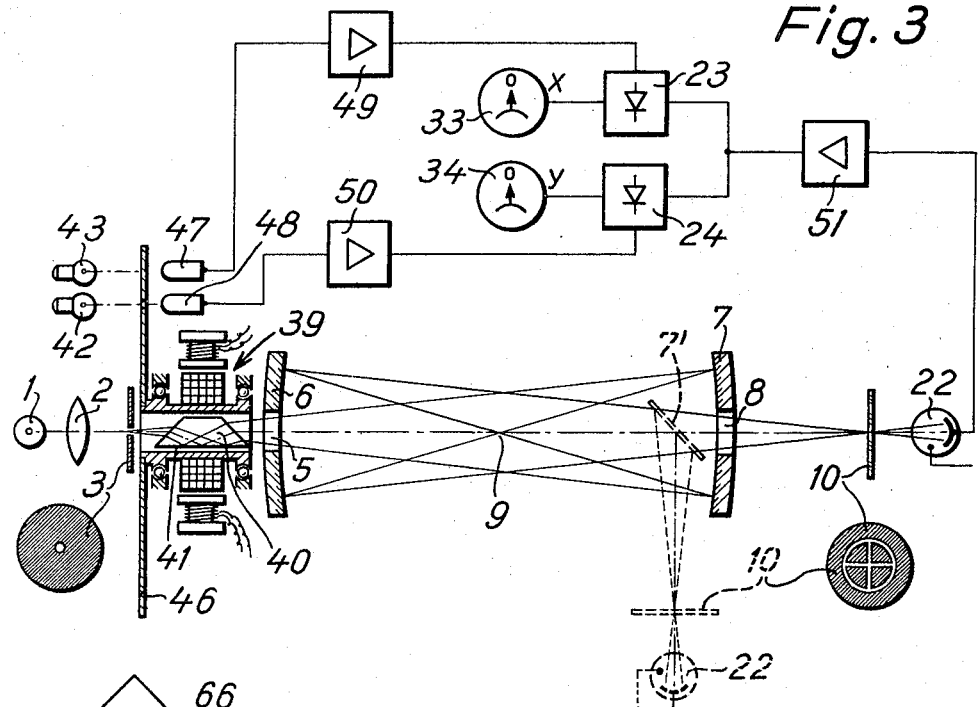
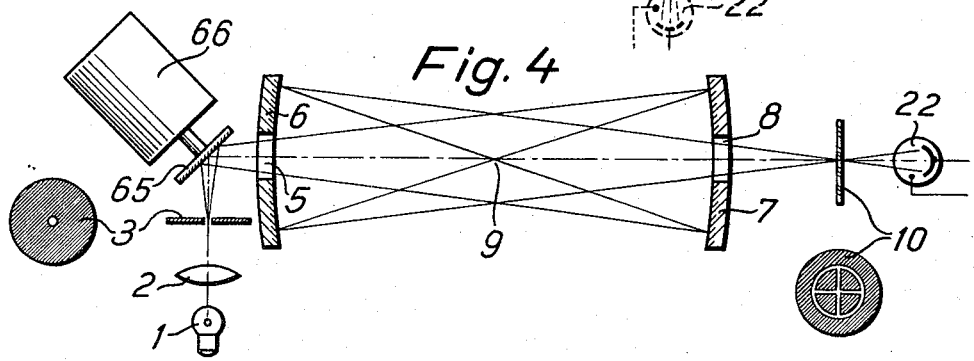
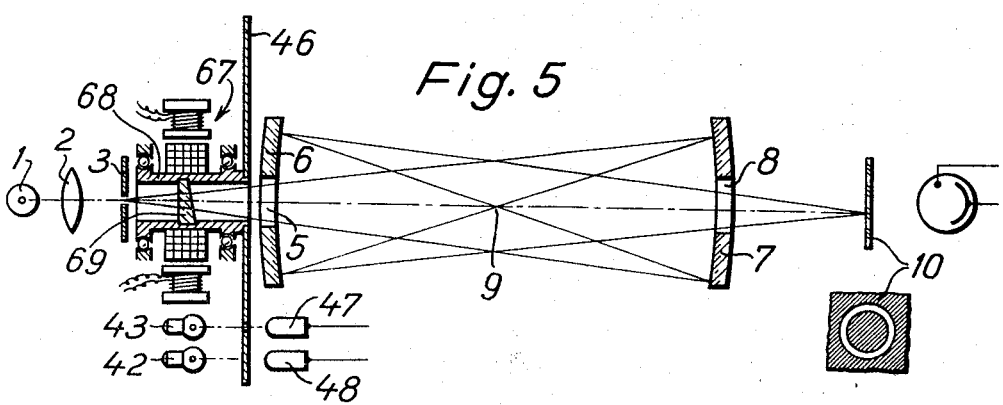

United States Patent Office 3,664,750
Patented May 23, 1972

3,664,750
OPTICAL APPARATUS FOR MEASUREMENT OF A SPATIAL FUNCTION
Fromund Hock, Wetzlar, Germany, assignor to Ernst Leitz G.m.b.H., Wetzlar, Germany
Filed June 29, 1970, Ser. No. 50,425
Claims priority, application Germany, July 3, 1969, P 19 33 719.0
Int. Cl. G01b 11/26
U.S. Cl. 356—167         14 Claims

ABSTRACT OF THE DISCLOSURE

Optical apparatus for measurement of a spatial function, e.g. the position of workpieces wherein the measurement is carried out by the following steps:
 (a) Determining the distribution of the interference function in the measuring field;
 (b) Fixing a time position correlation for the periodic measuring scan;
 (c) Conducting periodic scanning cycles in the scanning field, determining the signal components caused by the scanning and defining the properties of the frequency suppression filter connected after the signal scanning apparatus, wherein the filter suppresses the Fourier components of the output signal of the scanning apparatus containing the information regarding the interference field;
 (d) Connecting the filter defined by step (c) after the scanning device; and
 (e) Conducting the periodic measuring scan proper and evaluating the filtered signals obtained thereby.

CROSS-REFERENCE TO A RELATED APPLICATION

Applicant claims priority under 35 U.S.C. 119 for application P 19 33 719.0, filed July 3, 1969 in the Patent Office of the Federal Republic of Germany.

BACKGROUND OF THE INVENTION

The field of the invention is optical or pre-photocell systems wherein a spatial optical function is evaluated.

A measuring apparatus for the scanning of reflecting surfaces is conventional, bearing the registered trade name of "Perflektometer." This apparatus and its mode of operation are described in the German Pat. 859,815.

In this apparatus, the object to be measured is introduced into a beam reproducing at least one mark, so that the reflecting surface forming the contour of the object to be measured is disposed at the location of a projected image of the mark. In a scanning unit with auxiliary mark, which unit is adjusted to the projected image-plane, the image of the mark is produced directly in this plane and placed in a specific positional relationship with the same image of the mark generated by the rays reflected on the reflecting surface.

As known to the prior art, this apparatus produces in the viewing field a linear reduction in brightness which can be considered strictly as being linear with respect to the measuring coordinate in the vicinity of the projected image of the measuring mark. However, difficulties result therefrom as regards the photoelectric scanning of the position of the measuring marks reflected at the object. Depending on whether the object is guided toward the axis of collimation from the left or the right, the signal components indicating the respective position of the center of the object are shifted in the measuring signal by the superimposed interference field. During a photoelectric scanning procedure, if the field of observation is periodically scanned and if a threshold value switch is inserted in the signal processing circuits, rectangular pulses are produced, the central position of which is varied with respect to the center of the mark, depending on whether the object is being measured from the left hand side or from the right hand side. The apparatus according to the present invention is intended to eliminate these disadvantages.

It is known in the prior art that for the measurement of position-dependent object functions, for example in the measurement of the distribution of magnetic, electric, or electromagnetic wave fields, disturbances are created by interference variables superimposed on the measuring signals. These variables come from the surroundings of the object being measured or from the apparatus employed for the measurement.

The problem presented by the prior art is to develop methods and apparatus useful in connection with a plurality of different interference signals superimposed on the measuring signals and for the elimination of the interference signals.

SUMMARY OF THE INVENTION

The prior art problem is solved according to the present invention by providing a method distinguished by the following steps:
 (a) Determining the distribution of the interference function in the measuring field in a conventional manner;
 (b) Fixing a suitable time-position correlation for the periodic measuring scan;
 (c) Conducting a periodic scanning of the measuring field, determining the signal components caused by the scanning, and defining the properties of a frequency suppression filter connected after the signal scanning apparatus, which filter suppresses the Fourier components of the output signal of the signal scanning apparatus containing the information regarding the interference field;
 (d) Connecting the filter defined by step (c) after the signal scanning device; and
 (e) Conducting the measuring scan proper and evaluating the filtered signals obtained thereby.

The analysis of the observation field free of measuring marks during the oscillatory scanning with a sine-shaped time curve of the position functions yields interference signals containing only the fundamental wave of the scanning frequency. If then the reflected masuring mark is introduced into the measuring field, the signal spectrum pertaining to the measuring mark is superimposed on the present fundamental wave spectrum, and signals arrive at the output of the photoelectric receiver which are formed from the sum of the two signal spectra.

It is disclosed in the article "A Photoelectric Measuring Tube as Microscope, Automicroscope, Autocollimator, and Refractometer," published in the periodical "Microtecnic," vol. 5 (October 1966), pp. 522 et seq., that when scanning a measuring mark photoelectrically, the center of the mark can be defined by the zero passage of odd harmonics of the measuring signal.

It can be seen from the discussion above that, when suppressing the fundamental wave of the scanning frequency and selecting a suitable odd harmonic of this frequency, it is possible to suppress the interference signal components produced, as well as to obtain the desired information regarding the position of the mark with respect to the oscillation null point of the scanning movement. As a means for effecting this measure, a correspondingly dimensioned selective filter is suitably connected after the photoelectric receiver, which filter permits only the passage of one odd harmonic of the scanning frequency.

The determination of the distribution of the interference function in the measuring field can conventionally be conducted theoretically or by experiments. For example, in case an electric interference function is involved, then it is known that an electric field in space obeys a certain differential equation. From this, the vector field results, if marginal values are known, which however, means that the value of the spatial distribution of the interference field can be determined theoretically.

The determination of the distribution of the interference field by means of experiments is effected, for example, by first scanning the electric field without an object in the field of scanning. The field strength per location then yields the interference function. This interference function is split up into the Fourier components thereof during the periodic scanning process. By a suitable selection of the speed with which the scanning progresses, meaning however the function of the locality, it is possible to influence the Fourier components of the interference function in such a manner that they have as few as possible of their harmonics in common with the signal components produced by the scanning of the object. However, the signal components produced by the interference function are eliminated by means of filters which have no effect on the signal components representing the property of the object.

The problems which find solution according to the present invention are seen from the examples taken from the field of applied optics as set forth in the following disclosure.

BRIEF DESCRIPTION OF THE DRAWINGS

A number of embodiments of the "Perflektometer" apparatus are shown in the appended drawings, wherein:

FIG. 1 is a plan view, partly in section, showing the basic construction of the apparatus of the present invention for determining the position of workpieces;

FIG. 2 is a more detailed showing of the apparatus of FIG. 1, giving the configuration of the marks in the mark projector and the mark receiver;

FIG. 3 is an embodiment of FIG. 2, wherein the marks are projected by a rotating Dove prism;

FIG. 4 is an embodiment of FIG. 2, wherein the marks are projected by a rotating mirror;

FIG. 5 is an embodiment of FIG. 2, wherein the marks are projected by a blunt glass prism mounted on a rotor;

DESCRIPTION OF THE PREFERRED EMBODIMENTS

Figure 6:
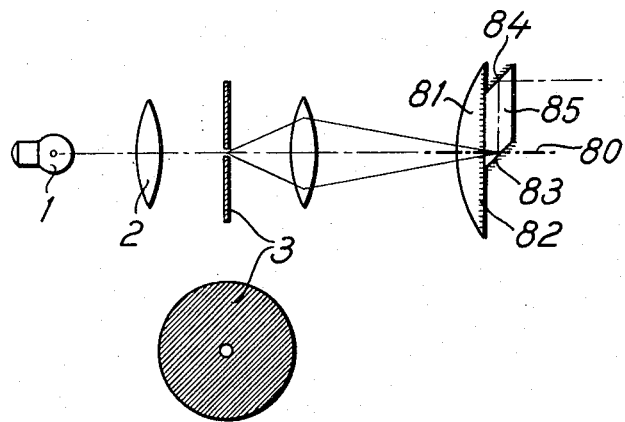
FIG. 6 is an embodiment of FIG. 2, wherein the marks are projected by deflecting mirrors mounted on the marked side of a lens having an axis of rotation parallel to the illumination.

In FIG. 1, a lamp 1 illuminates, via a condenser 2, an apertured diaphragm 3 with a mark. A beam of rays 4 emanating from this mark passes through the aperture 5 of a concave mirror 6 to a second concave mirror 7 disposed at a distance from the concave mirror 6 and likewise exhibiting an aperture 8. The condenser 2 reproduces the helical filament of the lamp 1 through aperture 5 on the mirror 7. The concave sides of the mirrors 6 and 7 are in opposition. The concave mirror 7 produces a virtual image 9 of the mark, which image is reproduced by the concave mirror 6 on a reference mark 10. The position of this image mark relative to the reference mark 10 is observed by means of an ocular 11.

A workpiece 12 is introduced into the space between the two concave mirrors 6, 7, so that the reflecting surface 13 of this workpiece 12 glancingly intercepts the virtual image. The image of the mark assumes the same position relative to the reference mark 10 and as in the case of a beam path without a workpiece, the surface 13 is disposed at the location of the virtual image 9. This fact is used as a criterion for the positional determination of the workpiece 12.

The measuring mark receiving device consisting of the reference mark 10 and the ocular 11 can, of course, be equipped solely or additionally with photoelectric transducers and electronic circuits associated therewith for the purpose of evaluating the measurements. The following description relates to the measuring marks required for such measuring mark receiving systems, and the scanning devices pertaining thereto.

In the embodiment according to FIG. 2, the mark is a cross-shaped slot provided in a diaphragm 20 oscillating linearly in the direction of the arrow. The oscillatory frequency thereof is assumed to be $f_1$. The diaphragm 20 is elastically mounted and is connected on two mutually opposed points with coils 35 of a moving coil magnet system 36. The coils 35 are supplied with an alternating current of the frequency $f_1$ by a generator 27. The reference mark 10 is in this case likewise shaped like a crossed slot in a diaphragm 21 oscillating linearly in the direction of the arrow, the oscillatory frequency being assumed to be $f_2$. The direction of oscillation of this diaphragm is thus perpendicular to the direction of oscillation of the diaphragm 20. The oscillation of this diaphragm is effected in the same manner as in case of diaphragm 20, a generator 28 feeding an alternating current having the frequency $f_2$. Behind the reference mark 21, as seen in the direction of light, a photoelectric receiver 22 is arranged to which is connected an electronic circuit for frequency separation according to the frequencies $3f_1$ and $3f_2$ by means of phase-sensitive rectifiers 23, 24. The use of only one transducer 22 is advantageous for the reason that two transducers possibly exhibit drift effects or spectral difference. The signals fed to the phase-sensitive rectifiers are suitably amplified in each case by selective amplifiers 25, 26, one of which is tuned to the frequency $3f_1$, and the other of which is tuned to the frequency $3f_2$. The reference signals $3f_1$ and $3f_2$, respectively, for the phase-sensitive rectifiers 23, 24 are derived from the output signals of the frequency generators 27, 28, which produce the oscillations of the diaphragms 20 and 21, respectively, and are obtained via frequency multipliers 29, 30, as well as phase shifters 31, 32. The signals emitted by the phase-sensitive rectifiers 23, 24 are fed to measurement indicating units 33, 34, respectively, which latter indicate the $x$- or $y$-deviation of the workpiece from a required position.

It is not only a positional signal which is supplied by the frequency separation for determining the position of the workpiece, but an adjusting signal is likewise provided in order to optimally align the workpiece first of all, with respect to the measuring beam path.

The following description relates to further embodiments which serve the same purpose as the above-described apparatus.

In the embodiment according to FIG. 3, the mark of the diaphragm 3 has the shape of a luminous dot which is stationary. A rotating Dove prism 40 produces a rotating image of the mark of diaphragm 3. The reflecting surface 41 of the Dove prism 40 is inclined with respect to the axis of rotation. The Dove prism 40 is rotated by means of a motor 39 exhibiting a hollow shaft wherein the Dove prism 40 is mounted. Simultaneously with the rotation of prism 40, disk 46 is rotated. This disk 46 is provided with slots disposed in two rows at different diameters. Each row is associated with a lamp 42 and 43 respectively, as well as with a photoelectric transducer 47 and 48, respectively. In combination with the disk 46 the lamps and the transducers form reference voltage dividers which produce switching pulses in synchronism to the rotation of the Dove prism 40. The output signals of the photoelectric transducers 47 and 48 are fed, via amplifiers 49, 50, in the form of control signals to phase-sensitive rectifiers 23 and 24.

It should be noted in the embodiment of FIG. 3, that the virtual image 9 is produced with double the rotational frequency as compared to that of the Dove prism 40, and that the diameter of the scanning circle is adjusted by a corresponding adjustment of the inclination of the Dove prism 40. The reference mark of the diaphragm 10, behind which the photoelectric transducer 22 is disposed, is fashioned as a cross-shaped slot. A rotating image of the mark of diaphragm 3 is produced in the plane of the diaphragm 10, so that per rotation, four light pulses impinge on the transducer 22. A lack of chronological symmetry of these light pulses is used for the automatic alignment of the workpiece 12. This automatic alignment can be realized from the type of deviation from symmetry and the workpiece 12 must be shifted to attain chronological symmetry.

As is indicated in the drawing in dashed lines, a deflecting surface 7' is disposed in front the mirror 7. Deflecting surface 7' directs the beam path to the diaphragm 10, now disposed laterally, and to the photoelectric receiver arranged therebehind. By this arrangement, the structural length of the device can be further reduced.

FIG. 4 shows that it is possible to employ, in place of the rotating Dove prism 40, a rotating mirror 65 which is rotatably mounted about an axis inclined with respect to its reflecting surface and is driven by a synchronous motor 66. This mirror produces a rotating image of the mark of the diaphragm 3. The evaluation is conducted as in the embodiment according to FIG. 3, wherein the synchronous motor also yields the reference pulses for the phase-sensitive rectifiers from the driving rotating field or from inductive or Hall generators wherein Hall generators are known per se ,e.g. by the article "Eigenschaften und Anwendungen der Hallgeneratoren" by Friedrich Kuhrt, published in VDE-Fachberichte Bd. 19 (1956).

FIG. 5 shows another embodiment for the production of a rotating mark image. The rotor 68 of a synchronous motor 67 exhibits a bore concentrically to its axis of rotation, wherein an inclined plane-parallel plate 69 or a blunt glass prism is inserted. The advantage of this system resides in that the tilt tolerance of the axis requires only low requirements.

In the embodiments with a rotating scanning motion described hereinabove, it is of importance that the axes of rotation of the light-deflecting optical components always maintain their position precisely in space and, for example, do not execute any tumbling motions. Consequently, the mounting of the mechanical drives must meet high demands with respect to accuracy, which often are difficult to realize. Therefore, an embodiment as shown in FIG. 6 overcomes these problems. The light emanating from the lamp 1 and passing through the condenser 2 as well as the aperture of the diaphragm 3 impinges on a lens 81 rotating about an axis 80. This lens serves the purpose of concentrating the impinging light to a point where a masking layer 82 provided on the side facing away from the lamp exhibits an aperture. On the same side of the lens, two mirrors 83 and 84 are attached so that the light beam passing through the masking layer is deflected twice. The two mirrors can be surfaces of a prism 85, as illustrated.

Figure 7:
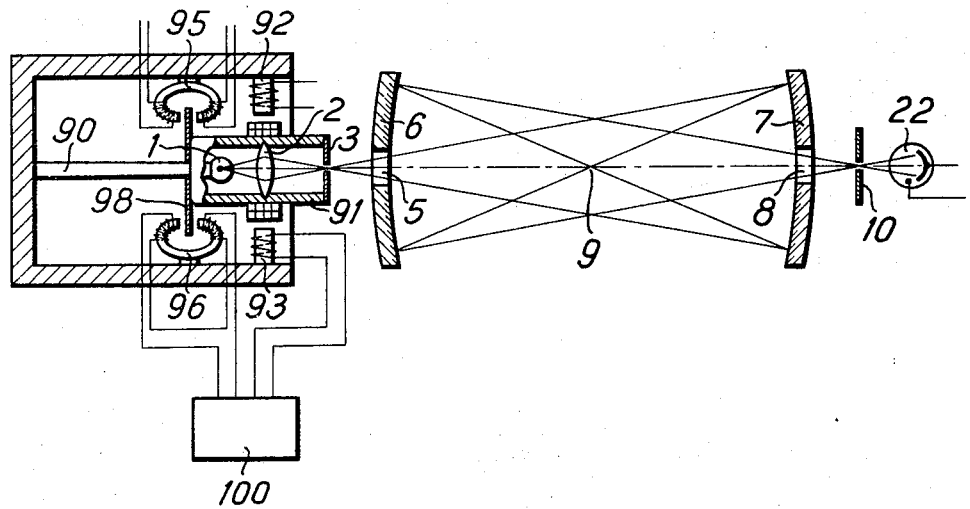
FIG. 7 is an embodiment of FIG. 2, wherein the source of illumination for the marks is vibrated on a flexible beam.

FIG. 7 shows another embodiment wherein the mark projector consisting of the lamp 1, the condenser 2, as well as the diaphragm 3, with a point-shaped mark, is mounted on a flexible rod 90. The flexible rod 90 is excited, together with the mark projector 1, 2, 3, to a circular oscillatory motion by means of a rotary electromagnetic field. The mark projector 1, 2, 3 is accommodated in a housing 91 wherein the magnet coils 92, 93 are also provided. Either four coils are arranged, offset with respect to one another by 90°, or three coils are provided which are offset with respect to one another by 120°. The use of such a rotational field makes it possible to control the frequency and/or the amplitude of the rotating mark field. In order to obtain signals corresponding to the circular oscillations of the mark projector, magnetic heads 95, 96 are provided, distributed along the periphery of the circular path. A lamella 98, attached to the housing 91 of the mark projector 1–3, extends into the gap of each of the magnetic heads. The number of the magnetic heads employed and their respective association corresponds to that of the magnet coils. The signals produced by the magnetic heads 95, 96 are employed for controlling a generator 100 and the phase-sensitive rectifiers, which latter are not shown in this figure. The generator serves for generating the excitation current for the coils 92, 93.

As mentioned above, the chronological asymmetry of the light pulses impinging on the receiver can be evaluated either by means of an electronic circuit or according to the frequency analyzing method. When scanning a surface 13 of a workpiece, the tangent to the scanning point on the curved surface must be parallel to the measuring direction in order to preserve chronological symmetry or time symmetry. Also in this case, the asymmetry of the chronological sequence of the light pulses can be used to derive a pair of signals making it possible to automatically control simultaneously the measurement lock-in of the surface at the location of the virtual image 9, as well as the optimum alignment of the measuring surface 13 with respect to the measuring direction. By shifting the reference signals relative to the rotating mark image (phase-shifted synchronous pulses) and to the reference mark 10, any measuring device is selected with is preferred with respect to the optical axis of collimation of the system formed by the members 2, 6, 7.

In the embodiments of FIGS. 3–7, the diphragm with the reference mark can additionally be provided with annular slots arranged concentrically with respect to the center of the cross. These annular slots are then associated with photoelectric transducers by way of optical auxiliary members, such as Billet's lenses or mirrors or prisms. These transducers yield preliminary signals for mark images lying far from the lock-in position, which signals make it possible to place the workpiece 12 into a position approximating the lock-in position. Billet's lenses are disclosed in the special dictionary "ABC der Optik" from the publishers Werner Dausien, Hanau am Main, Germany, edition 1960, 140. The placing of the workpiece into the required position can thus be effected stepwise with increasing fine adjustment. For this purpose, the scanning devices of FIGS. 2 and 7, which are controllable in their amplitude, are especially well suited.

It should furthermore be noted that the mark 3 can also be fashioned as a self-luminous body, for example as the p-n junction of a semiconductor.

The devices decribed herein are especially suitable for the scanning of large and rough workpieces since, on the one hand, the devices can be maintained relatively small in their dimensions and, on the other hand, it is also possible to utilize light in the infrared range.

It may be necessary to dispose the mark projector or the observation unit beside the mirror objectives, rather than behind these objectives. One reason for this is the additional reduction of the structural length. Another reason is the manufacture of the aperture in the mirror objective. In this case, as shown in FIG. 3, a deflecting surface is disposed in the center of the mirror objective and this deflecting surface directs the laterally impinging light beam onto the other mirror objective, or directs the narrow image beam to the observation device.

All the aforementioned apparatus for conducting the measuring method described hereinabove have in common that they exhibit two mirror objectives which are oriented toward each other with their concave sides and are disposed at a spacing from each other, but in centered relationship, and that one mirror objective is associated with a projector, and the other mirror objective is associated with a component defining a reference position, preferably a diaphragm with a reference mark, as well as an observation unit and/or a photoelectric receiver system.

In these apparatus, the workpiece is introduced into the interspace between the two concave mirrors and the undisturbed space not occupied by the workpiece takes up almost the entire image beam path of the projector and of the measuring mark receiving unit. The total structural length of the novel apparatus thus does not become substantially larger than the maximum size of the workpiece. Besides, very long wave light can be transmitted through the mirrors, so that also rough, still reflective, workpiece surfaces are scanned.

Figure 8:
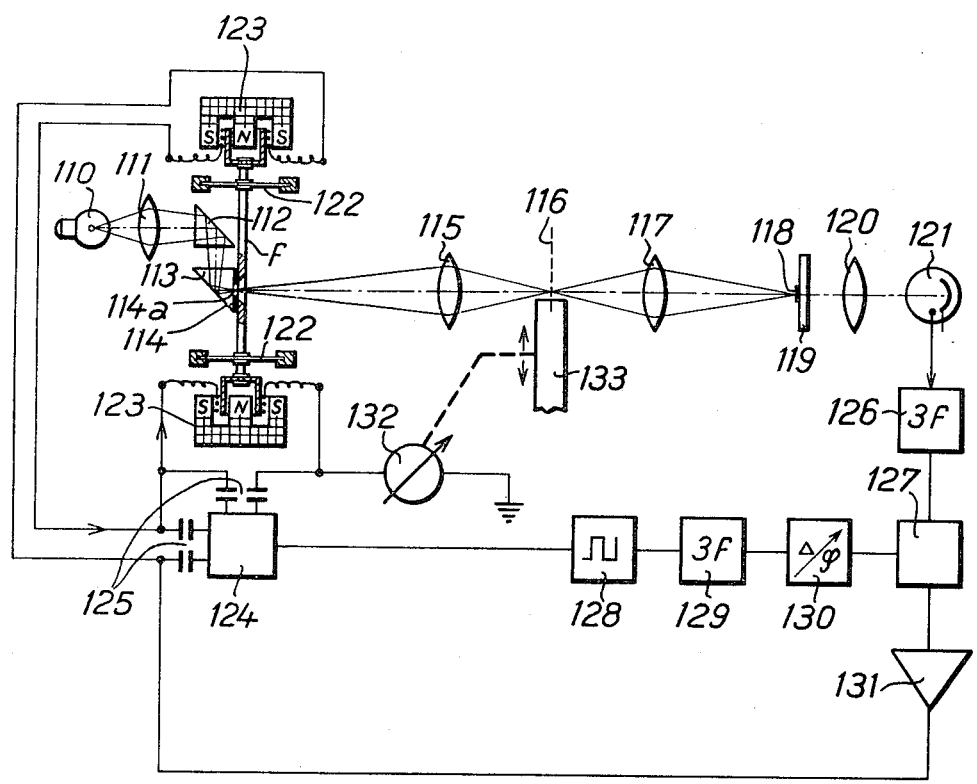
FIG. 8 is a plan view, partly in section, showing a simplified embodiment of an apparatus for determining the position of workpieces.

If it is desired to determine the position of an object only along one coordinate direction, and if it is certain that the objects to be measured exhibit flawlessly reflecting boundary surfaces, then it is also possible to employ for the measurement a device which is simpler in its construction, as illustrated in FIG. 8.

A lamp 110, via a condenser 111, a prism 112, and a prism 113, illuminates an oscillating diaphragm 114 provided with a slot 114a. This luminous slot is reproduced by means of a lens 115 in an image plane 116. The image plane 116 is reproduced, by a further lens 117, on a mark carrier 119 exhibiting a mark 118. The mark carrier 119 is scanned by way of an optic 120 by a photoelectric receiver 121.

The prism 113 is fixedly attached to the diaphragm 114. The diaphragm 114 is movably mounted by means of two membranes 122. The oscillatory movement of the diaphragm 114 is produced by means of two moving coil magnet systems 123 fed by a generator 124. Capacitors 125 are employed so that only alternating current passes from the generator to the systems 123.

The output signals of the receiver 121 are fed via a band-pass filter 126, tuned to a harmonic of the scanning frequency of the diaphragm 114, to a modulator 127. The modulator 127 is controlled by the signals of the generator 124 after these signals have passed a pulse shaping stage 128, a band-pass filter 129 tuned to the same harmonic of the scanning frequency of the diaphragm 114 and a phase shifter 130. A control amplifier 131 is connected after the modulator, supplying the series-connected moving coil systems 123. The current flowing through the moving coils is indicated by means of an indicating instrument 132 and this instrument can also be used, as indicated in dashed lines, for controlling the position of the test specimen 133 introduced in the area of the image plane 116 between the two lenses 115 and 117.

I claim:

1. An optical measuring apparatus for determining the position of a workpiece in two coordinate directions perpendicular to an optical aiming axis, comprising in combination;
   (a) mark projecting means for forming an illuminated scanning mark including a light source (1) and a mark forming means (3, 20);
   (b) mark receiving means (10) defining a reference position optically aligned along an aiming axis with said mark projecting means for receiving the scanning mark projected thereby;
   (c) first and second concave mirror objectives (6, 7) oriented toward each other with their concave sides facing one another and spaced from one another in a centered relationship defining a measuring field along the optical aiming axis between the mark projecting means and the mark receiving means, one of said concave mirror objectives (6) associated with said mark projecting means and the other of said concave mirror objectives (7) associated with said mark receiving means;
   (d) photoelectric means optically aligned with said mark receiving means and associated therewith for determining the position relative to the aiming axis of a workpiece inserted between said first and second concave mirror objectives (6, 7); and
   (e) scanning means for scanning the measuring field with said scanning mark to generate a signal in said photoelectric means representative of the position of the workpiece, periodic cycling means associated with the scanning means to cause the scanning mark to periodically scan the measuring field in predetermined time position correlation, filter means connected to the photoelectric means for filtering and suppressing the Fourier components of said signal, and indicating means connected to said filter means for receiving the filtered signal therefrom whereby a visual indication of the position of a workpiece is obtained.

2. The apparatus of claim 1, wherein said scanning means comprises means for producing an oscillating image (9) and said scanning means are combined with said mark projector.

3. The apparatus of claim 1, wherein the mark receiving means defining a reference position is a diaphragm (10) having a reference mark and said photoelectric means includes a photoelectric receiving unit (22).

4. The apparatus of claim 1, wherein at least one of the concave mirror objectives (6, 7) has an aperture (5, 8).

5. The apparatus of claim 3, wherein a deflecting surface (7') is combined with at least one of the concave mirror objectives (6, 7).

6. The apparatus of claim 3, wherein said mark projecting means comprises illuminating means (1, 2) and a diaphragm (3) with at least one mark.

7. The apparatus of claim 2, wherein said photoelectric receiving unit (22) is connected to phase-sensitive rectifiers (23, 24) for receiving output signals which are controlled by means of reference signals depending on the oscillation of said oscillating mark image (9).

8. The apparatus of claim 2, further comprising a reference voltage generator (27, 28; 42, 43; 95, 96) synchronously oscillating said mark image (9).

9. The apparatus of claim 2, wherein a rotating Dove prism (40) which is slightly inclined with respect to the optical axis produces said mark image (9).

10. The apparatus of claim 2 having a tumbling mirror (65) for producing said mark image (9).

11. The apparatus of claim 2, having a rotating transparent plate (69) disposed in the optical axis and being slightly inclined with at least one of its planar surfaces with respect to the optical axis for producing said mark image (9).

12. The apparatus of claim 2, having two rotating mirrors (83, 84) for producing said mark image (9).

13. The apparatus of claim 2, having said mark projector (1, 2, 3) attached to a flexible rod (90) and means for producing an electric rotational field on said mark projector and said flexible rod.

14. The apparatus of claim 7, wherein the photoelectric means includes band-pass filter means (126) operatively connected to the photoelectric receiving means, said filter means tuned to an odd harmonic of the oscillatory frequency of said diaphragm, said filter means being connected to modulator means (127) and generator means (124) connected to said modulator means for controlling the oscillatory movement of said mark projecting means.

References Cited

FOREIGN PATENTS

| 1,159,365 | 1966 | England | 356—170 |
| 458,762 | 1968 | Germany | 356—170 |
| 1,294,955 | 1962 | France | 356—156 |
| 773,238 | 1957 | England | 356—109 |
| 901,849 | 1962 | England | 356—167 |

WILLIAM L. SIKES, Primary Examiner

J. ROTHENBERG, Assistant Examiner

U.S. Cl. X.R.

250—219 WD; 350—294